R. G. GOLDMAN.
LUBRICATING SYSTEM.
APPLICATION FILED AUG. 12, 1919.
1,406,847.
Patented Feb. 14, 1922.
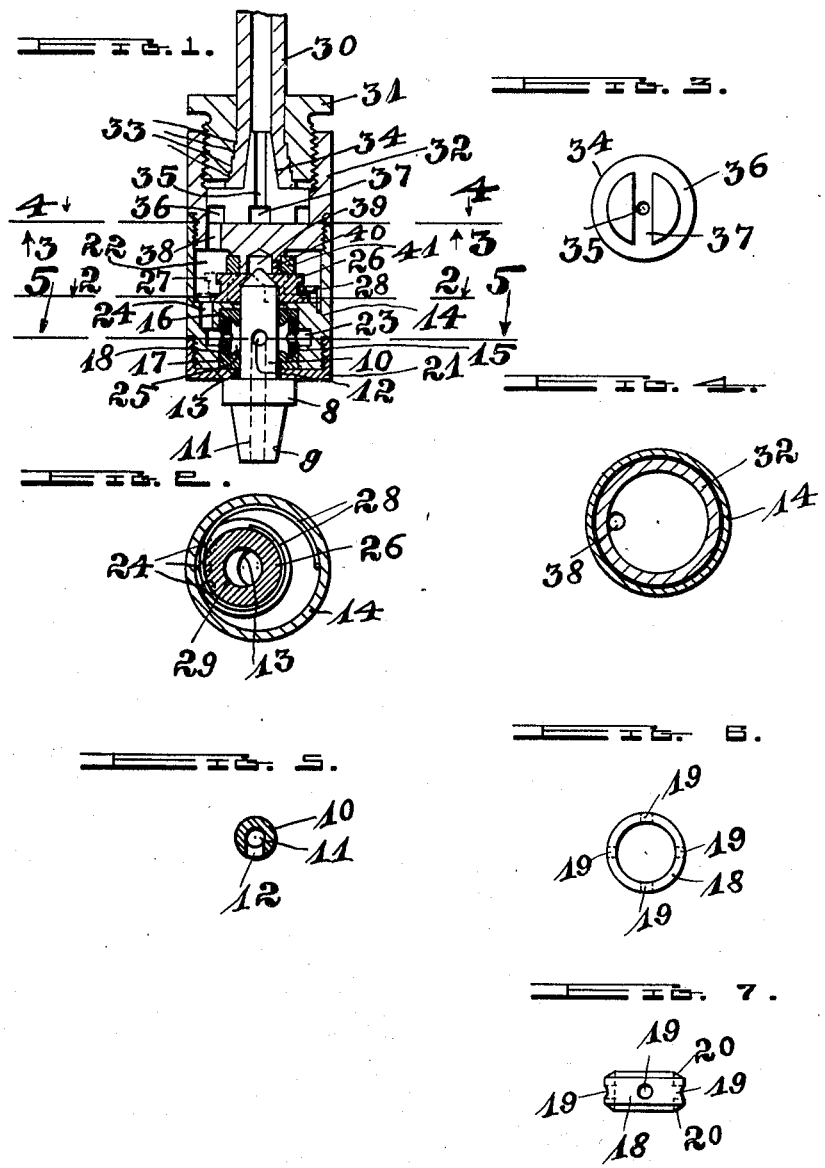

UNITED STATES PATENT OFFICE.

RUTHERFORD G. GOLDMAN, OF LOS ANGELES, CALIFORNIA.

LUBRICATING SYSTEM.

1,406,847.  Specification of Letters Patent.  Patented Feb. 14, 1922.

Application filed August 12, 1919. Serial No. 316,991.

*To all whom it may concern:*

Be it known that I, RUTHERFORD G. GOLDMAN, a citizen of the United States, residing at Los Angeles, in the county of Los Angeles and State of California, have invented certain new and useful Improvements in Lubricating Systems, of which the following is a specification.

This invention relates to devices for injecting lubricants into grease cups or other similar parts of machinery.

One object of this invention is to provide a device which can easily be operated against excessive pressure in such lubricating parts of machinery.

Another object is to provide an interconnection between the lubricant-injecting device and the lubricating part of the machinery which will not require a screwing or attaching while having the tendency of holding or even sucking itself to the lubricating part of the machinery.

Another object is to provide a cylindrical nipple and corresponding valve casing as interengaging parts of the device between the lubricant-injecting device and the lubricant-receiving device of such construction as to hold the smooth cylindrical nipple within the valve casing of the device by the very pressure passing through the valve casing and nipple.

Another object is to provide an automatic cut-off valve within the device, automatically shutting off the passage through and in the valve casing of the device when the same is withdrawn from the nipple.

Another object is to provide packing members in the device which prevent the discharging of lubricant through the device in any other but the desired direction.

Another object is to provide a suitable hose connection for the device to be connected to a grease gun or other similar lubricating or lubricant-injecting devices.

Other objects will appear from the following description and appended claims as well as from the accompanying drawing, in which—

Fig. 1 is a longitudinal sectional view of the device.

Fig. 2 is a cross section of the device on line 2—2 of Fig. 1.

Fig. 3 is an end view of the distributing nipple of the device seen in the direction of the arrows 3—3 of Fig. 1.

Fig. 4 is a cross section through the device on line 4—4 of Fig. 1.

Fig. 5 is a horizontal section on the line 5—5 of Fig. 1.

Fig. 6 is a top plan view of the packing-spacing and lubricant-distributing ring of the device.

Fig. 7 is a side elevation of the ring in Fig. 6.

To make the objects and the working of this device better understood, the following will serve to point out several of the actions and advantages of the device and of several detail parts of the device: In injecting lubricant into bearings, grease-cups, and other similar lubricant holding devices, it is a common occurrence that lubricant is squeezing out at a point between the lubricant-injecting device and the lubricant-holding and distributing device, on which the lubricant-injecting device is used. Furthermore, it is a common occurrence that lubricant is squeezing out of the lubricant-injecting device as soon as and after the lubricant-injecting device is withdrawn from the lubricant-holding device (that is from the bearings, grease-cups, or other similar places and parts of machinery which are usually supplied with lubricant).

In such cases, in some of the devices now in use, it is sought to prevent such discharging, escaping, or squeezing-out by providing a screw connection between the lubricant-injecting part and the lubricant-receiving part, but, to my knowledge, all such provisions are time-robbing and somewhat complicated in application.

This new device is simple and partly automatic in operation. The nipple 8 is screwed into or otherwise suitably secured to bearings, the top of grease-cups, or other similar parts of machinery. This nipple forms therefore practically a part of the device, especially in its peculiar construction. One end 9 of the nipple is preferably threaded to make it easily applicable to such lubricant-receiving and holding parts. The opposite end 10 of the nipple forms a smooth cylindrical body. A bore 11 is provided in the nipple from the threaded end inwardly terminating in a laterally extending duct 12. The bore 13 of the valve casing fits slidingly over the smooth cylindrical body of the nipple 8. The body 14 of the valve casing is provided with a bore 15, into which the packing rings 16 and 17 are disposed. A spacing ring 18 is disposed between the two packing rings. This spacing ring also forms a lubricant distributing means between the valve casing and nipple. In Figs. 6 and 7 this ring is illustrated in detail, the top plan view in Fig. 6 showing the several perforations or holes 19 by which the lubricant can pass through the ring 18, that is also as much as allowing the lubricant to pass through or between the packing rings 16 and 17, as will be more clearly explained later on; the side elevation of the ring 18 in Fig. 7 showing the beveled edges 20, which engage the packing rings 16 and 17 in such a manner as to keep the rings in their correct position within the valve casing, and facilitating the tight joint between the valve casing and nipple. A cap 21 is screwed over the outer end of the body 14, holding the packing rings 16 and 17 and the spacing ring 18 in position within the valve casing.

The opposite end of the body 14 of the valve casing is hollowed out as indicated at 22. An annular recess 23 is provided in the body 14 at about a point to come into alignment with the perforations or holes 19 in the spacing ring 18 as can be clearly observed in Fig. 1. A bore 24 communicates with this recess 23 at one end and with the inside of the body—that being the hollowed out space 22 described above at the other end. Such communication allows lubricant to pass from the hollowed out space or chamber 22 to the recess 23, and from there through perforations or holes 19 in the spacing ring 18 into a space 25, between the spacing ring 18 and the smooth body 10 of the nipple 8. The nipple, having a side hole or bore 12 which communicates with the outwardly going bore 11, naturally allows the lubricant to pass from the space 25 out of the bore 11.

A check valve 26 is disposed within the chamber 22, normally in closing position above the communicating conduit 24 as indicated in dotted lines at 27, held and moved into such closing position by the spring 28, such position being more clearly illustrated in Fig. 2. The check valve is provided with a recess 29 of a size to easily engage with the smooth body of the nipple when such is inserted into the valve casing from through the bore 13 in the lower end of the valve casing, as will easily be understood from the illustrations in Figs. 1 and 2. Three communicating conduits are shown in Fig. 2, but it will easily be understood that any suitable number of such communicating conduits 24 can be provided, as long as they can be covered by the shifting check valve.

The valve casing is preferably connected to the hose 30. Of course a tube or similar means may be used as well. Using a hose, a gland 31 is disposed over the end of the hose and screwed into the connecting member 32. The bore of the gland 31 is preferably provided as illustrated step by step increasing towards the end as indicated at 33 to take a good grip on the end of the hose. A taper nipple 34 is inserted into the end of the hose having a central bore 35. The opposite end of the nipple 34 is cut down to form an annular shoulder 36, being an annular space between that end of the nipple and the inside of the connecting member 32. A cross cut-out 37 in the same end of the nipple forms a communicating conduit between the bore 35 and the annular space 36, as will be more clearly understood from the illustration in Fig. 3. The connecting member 32 is provided with a bore 38 forming a communicating conduit between the annular space 36 and the chamber 22 in the main body 14.

When the nipple is withdrawn from the valve casing, before the check valve can close the communicating conduits 24, a small amount of lubricant may pass from the device into the space 25. This lubricant is naturally in the bore into which the nipple has to come when an interconnection is made between the nipple and valve casing, and, to prevent the loss of this lubricant, a suitable recess 39 is provided in the lower end of the connecting member 32 having a small communicating opening 40 to communicate with the chamber 22. Normally this small opening 40 is covered by the packing ring 41, which, under normal conditions when the pressure is coming from the chamber 22 towards the lower end of the connecting member 32 and towards the check valve 26, tends to form a tight joint between the connecting member 32 and the check valve 26.

My invention is particularly applied to lubricating systems but obviously could be used for any fluid desired and hence it is pointed out that by the word "fluid" as used hereafter, I mean any fluid including gas, water, oils, greases, etc.

Having thus described my invention, I claim:

1. The combination with a valve-casing having passages therethrough, of a cam controlled check-valve controlling the passages, and a nipple having a cam face for operating said check-valve to permit passage of fluid through the casing and through the nipple when the nipple is inserted in said casing.

2. The combination with a valve-casing having longitudinal passages therein, of a laterally movable cam operated check-valve controlling the passages, and a fluid-receiving nipple having a cam face for operating said check-valve to permit the passage of fluid through the casing into the nipple.

3. In a fluid pressure system, a smooth cylindrical nipple having a bore extending from one end into the body of the nipple and having another bore from the outside of the body to the first-named bore transversely from the first-named bore towards the outside, and a valve casing slidingly fitting over the nipple having means within the valve casing at a point coming to either side of the bore sidewise of the nipple for holding the valve casing on the nipple when fluid is pressed through the device.

4. In a fluid pressure system, a smooth cylindrical nipple having a bore in the smooth cylindrical body to about its middle and another bore extending from one end of the cylindrical body to the first-named bore for communication, and a valve casing slidingly engaging over the nipple, the valve casing having a recess at its open end and an annular recess within the side of the recess, conduits being provided from the annular recess to the inside of the valve casing, one packing ring being disposed within the main recess on each side of the annular recess, a spacing ring being disposed between the two packing rings spaced from the smooth nipple having perforations communicating with the annular recess forming the communication from the inside of the valve casing to the discharge bore in the nipple.

5. In a fluid pressure system, a smooth cylindrical nipple having a bore in the smooth cylindrical body to about its center and having another bore extending from one end of the cylindrical body to the first-named bore for communication, a valve casing slidingly engaging over the nipple, the valve casing having a recess at its open end and an annular recess within the cylindrical side of the first-named or main recess, conduits being provided extending from the annular recess to the inside of the valve casing, packing rings disposed within the main recess one on each side of the annular recess, a spacing ring being disposed within the main recess between the two packing rings spaced from the smooth body of the nipple having perforations communicating with the annular recess forming the communication from the inside of the valve casing to the discharge bore in the nipple, and a check valve disposed within the valve casing above the conduits having means for engaging with the nipple when the nipple is inserted into the valve casing adapted to allow a passing of fluid from the inside of the valve casing through the conduits to discharge from the nipple bore, the check valve adapted to shut off the conduits when the nipple is not inserted in the valve casing.

6. In a fluid pressure system, a smooth cylindrical nipple having a bore in the smooth cylindrical body to about its center and having another bore extending from one end of the cylindrical body to the first-named bore for comunication, a valve casing slidingly engaging over the nipple, the valve casing having a recess at its open end and an annular recess within the cylindrical side of the first-named or main recess, conduits being provided extending from the annular recess to the inside of the valve casing, packing rings disposed within the main recess one on each side of the annular recess, a spacing ring being disposed within the main recess between the two packing rings spaced from the smooth body of the nipple having perforations communicating with the annular recess forming the communication from the inside of the valve casing to the discharge bore in the nipple, a check valve disposed within the valve casing above the conduits having means for engaging with the nipple when the nipple is inserted into the valve casing adapted to allow a passing of fluid from the inside of the valve casing through the conduits to discharge from the nipple bore, the check valve also adapted to shut off the conduits when the nipple is not inserted in the valve casing, and a gland in the further end of the valve casing having a bore step by step increasing to its end for engaging a hose tightly to the valve casing, all substantially as described.

7. The combination with a valve-casing having a longitudinal passage therein, of a laterally movable cam operated check-valve controlling the passage, a fluid-receiving nipple having a cam face for operating said check-valve to permit the passage of fluid through the casing into the nipple, and resilient means for closing the valve upon the withdrawal of the nipple.

8. A fluid pressure system including a valve casing, a laterally slidable valve therein which normally closes the passage through the valve-casing, and means insertable in the valve which opens the valve when inserted therein.

9. A fluid pressure system including a valve casing having an opening therein, a valve movable in the casing, said parts each having an opening therein which are normally out of registry, and means insertable in said openings, thereby bringing them into substantial alignment and moving and holding the valve in one of its positions.

10. A fluid pressure system including a valve casing, a valve operable therein, and a nipple insertable in the valve and valve-casing having a closed end adapted to enter said valve, and having a lateral inlet to receive fluid laterally under pressure for equalizing the pressure upon the nipple the diameter of the nipple on both sides of the inlet being the same, thereby tending to hold the valve casing and nipple together and prevent the nipple from being forced out of the valve casing.

11. A fluid pressure system including a valve casing, and a nipple having a laterally extending bore, more or less remote from the closed end thereof, as the only means for introducing the fluid into the nipple the arrangement being such that there is no pressure on the end of the nipple tending to force the nipple out of the casing.

12. The combination with a nozzle having a recess to receive fluid under pressure, a nipple insertable in the nozzle part of which passes beyond the recess, a lateral bore in the nipple registering with the recess as the only means for introducing the fluid into the nipple, the arrangement being such that no other means are necessary to hold the nipple in the nozzle as the pressure normally tending to force the nipple out is balanced and the nipple is held in the nozzle by internal pressure on the closed end of said nipple.

13. A fluid pressure system including a nozzle having a passage opening laterally into a recess through which fluid passes under pressure, and a fluid receiving nipple insertable into the nozzle through the recess, part of the nipple adapted to pass beyond the recess, said nipple having an opening registering with the recess when the nipple is fully inserted in the nozzle for balancing the pressure of the fluid and retaining the nipple in the nozzle.

14. A fluid pressure system including a nozzle having a recess into which fluid passes under pressure, a fluid receiving nipple insertable in the nozzle, a part of which nipple enters the recess, said part having a lateral bore for receiving fluid the diameter of the nipple on both sides of the bore being the same, whereby the pressure of the fluid is balanced, and the nipple is retained in the nozzle.

15. A fluid pressure system including a nozzle and a fluid receiving nipple insertable in the nozzle, means for holding the nipple in the nozzle including a lateral bore in the nipple as the only means for entrance of fluid from the nozzle and a friction element in the recess.

16. A fluid pressure system including a nozzle having a passage therethrough, a laterally slidable valve therein which normally closes the passage, a nipple insertable in the nozzle, and means on the nipple for actuating the valve upon the insertion of said nipple.

17. A fluid pressure system including a nozzle, a fluid receiving nipple insertable in said nozzle, said nipple having a closed end and a lateral bore away from the end as the only means of entrance of fluid, so arranged that the back pressure in the nozzle is eliminated and the nipple is retained in the nozzle, said nipple being of the same diameter on both sides of said bore.

18. The combination with two interfitting parts capable of transmitting fluid pressure and having a sliding longitudinal frictional engagement only with each other, of means for transmitting fluid pressure laterally from one part and receiving it laterally in the other part.

19. The combination with a nozzle having a recess, of a nipple longitudinally slidable in the nozzle having frictional engagement only therewith and having an inlet in position to register laterally with said recess, and means forming a fluid tight joint on either side of the inlet.

20. The combination with a nozzle, having a recess, of a nipple insertable in the nozzle, having an inlet in position to register laterally with said recess, and means forming a fluid tight joint on either side of the inlet, said means comprising spaced washers with which the nipple engages.

21. The combination with a nozzle, of a nipple insertable in the nozzle, and having a lateral inlet and means in the nozzle for introducing fluid under pressure into the lateral inlet and against the sides only of said nipple whereby the pressure on the nipple is balanced and it is not forced out of the nozzle by the pressure therein.

22. The combination with a nozzle, spaced washers in the nozzle forming a recess into which fluid passes under pressure, said washers having openings, a nipple having a lateral inlet, insertable in the nozzle and so arranged that the inlet registers with the recess and the openings in the washers are closed by the nipple forming a fluid tight joint on either side of said inlet.

23. The combination with two interfitting elements having longitudinal frictional engagement only with each other, one of said elements having a lateral inlet and means in the other element for introducing fluid pressure to the inlet in a direction transverse to the line of movement of said elements.

In testimony that I claim the foregoing as my invention I have signed my name in the presence of two subscribing witnesses.

RUTHERFORD G. GOLDMAN.

Witnesses:
C. R. HAINES,
J. R. CHEATHAM.